July 28, 1931.  R. N. HEALD ET AL  1,816,082
GRINDING MACHINE
Filed March 29, 1927   6 Sheets-Sheet 3

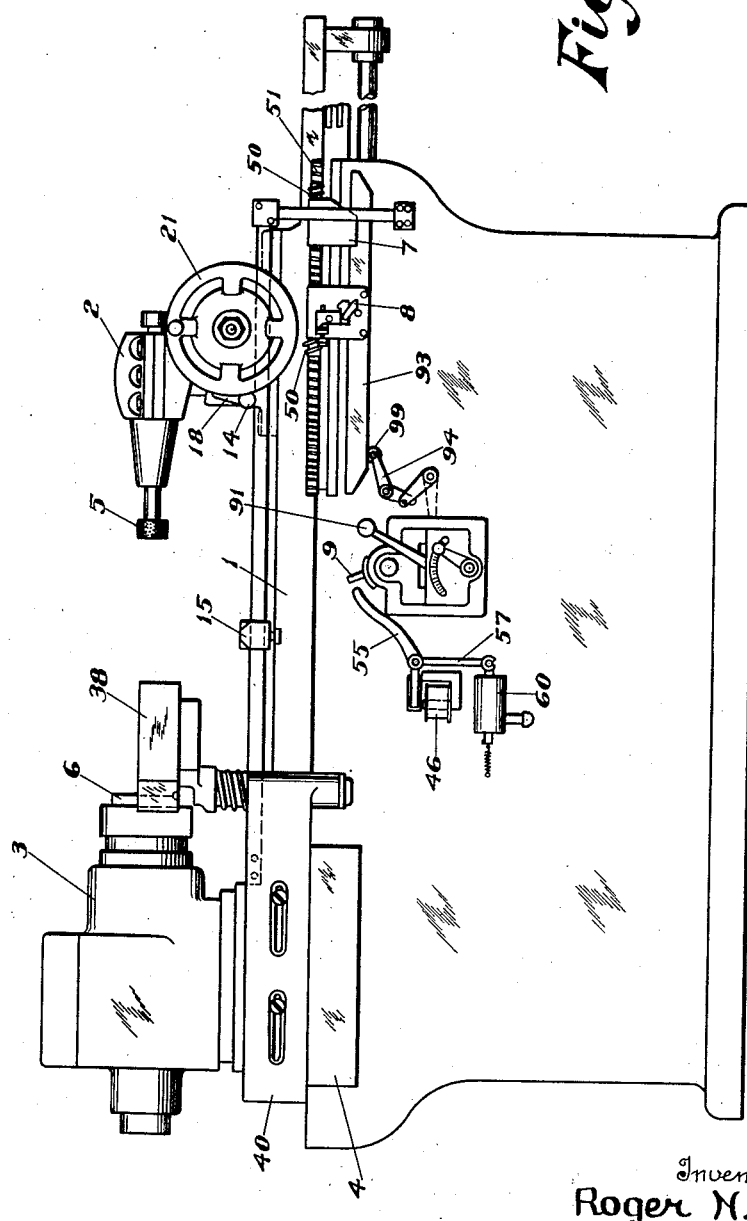

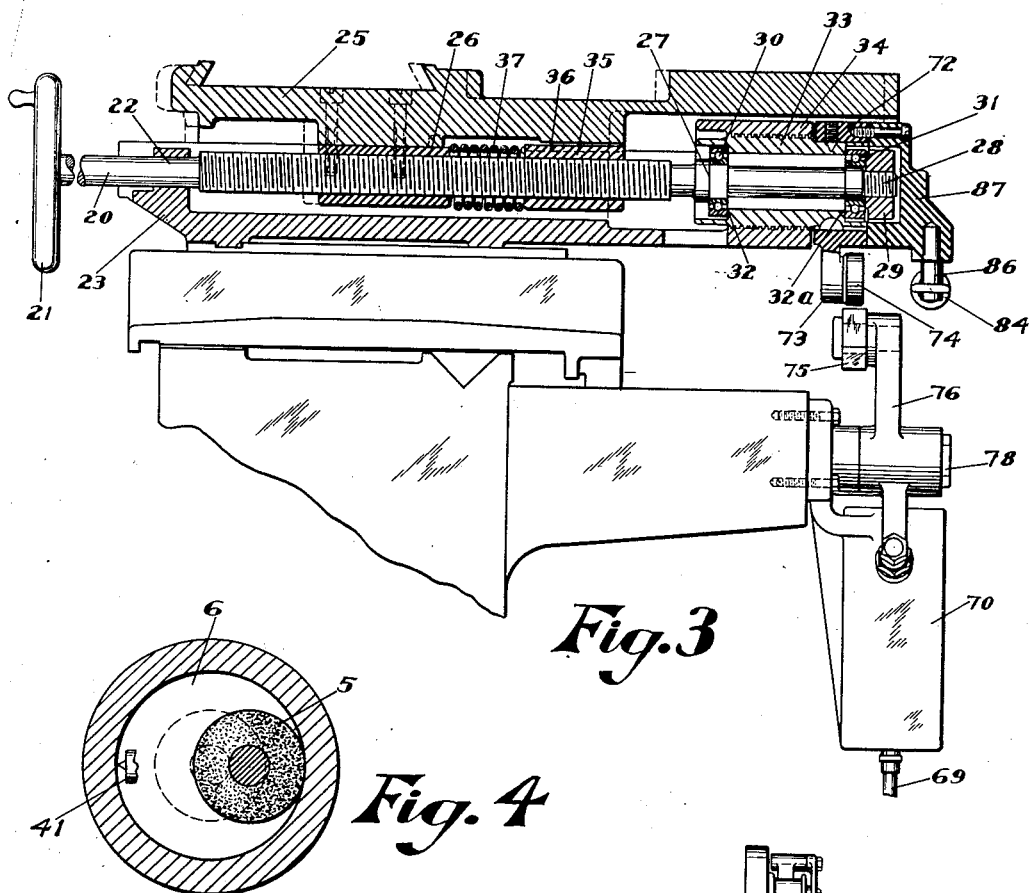
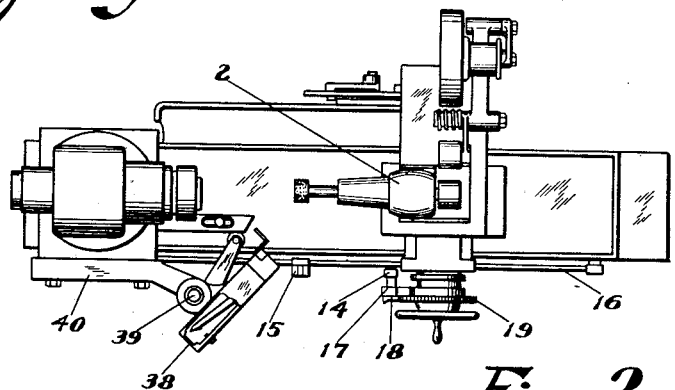

Inventors
Roger N. Heald
Waldo J. Guild
Geo. W. Kennedy Jr.
Attorney

Inventors
Roger N. Heald
Waldo J. Guild
By Geo. H. Kennedy Jr.
Attorney

Inventors
Roger N. Heald
Waldo J. Guild

Patented July 28, 1931

1,816,082

UNITED STATES PATENT OFFICE

ROGER N. HEALD AND WALDO J. GUILD, OF WORCESTER, MASSACHUSETTS, ASSIGNORS TO THE HEALD MACHINE COMPANY, OF WORCESTER, MASSACHUSETTS, A CORPORATION OF MASSACHUSETTS

GRINDING MACHINE

Application filed March 29, 1927. Serial No. 179,352.

The present invention relates to internal grinding machines, and particularly to those machines of that description in which the grinding automatically ceases when the workpiece reaches finished size.

In certain machines of this class now in use, the carriage or table of the machine carrying either the grinding wheel or the workpiece has imparted to it, upon the workpiece reaching finished size, a rapid withdrawal movement, thus separating grinding wheel and workpiece, and allowing the latter to be removed from the machine. This action is brought about automatically, either by a gauge or caliper device adapted to directly measure the size of the workpiece, or by size-determining devices associated with the usual cross-feed mechanism of the machine.

When this movement of longitudinal separation between workpiece and grinding wheel occurs, the rapidly rotating wheel leaves scratches or lines on the finished surface of the workpiece, these scratches being substantially helical, and being most noticeable near the outer end of the workpiece. The scratches do not spoil the workpiece in a mechanical sense, as they are scarcely measurable, but they render it less merchantable, as may be readily understood.

Certain conditions of machine operation aggravate the occurrence of these scratches:—first, in the interests of rapid production, it is usually the practice to effect an acceleration of the table on this withdrawal movement, and such acceleration may begin before the wheel leaves the hole in the workpiece, and second, when the grinding wheel is passing out of the workpiece, its pressure per lineal distance of contact gradually increases, due to the decreasing area of contact,—this causing the edge of the wheel to leave these scratches.

The present invention overcomes this difficulty by causing the work and wheel to separate laterally before they separate longitudinally. In one embodiment of the invention, it is shown applied to a grinding machine equipped with a work-calipering device, and in another embodiment, to a grinding machine in which the cessation of grinding is brought about by size-determining mechanism associated with the cross-feed of the machine.

In certain of its aspects, the present invention is one of adaptation and improvement to the prior invention of Kempton and Gallimore, as disclosed in a copending application Serial No. 38,629, filed June 22, 1925. According to said prior invention, means are provided to shift the workhead laterally at the completion of a grinding operation. In the present invention, however, not only is a different and more accurate means used for the purpose of procuring the lateral separation, but the part which is given the movement of separation laterally is located upon a moving table or carriage.

In the drawings illustrating these two embodiments,

Fig. 1 is a front elevation of an internal grinding machine.

Fig. 2 is a plan view of said machine.

Fig. 3 is an enlarged transverse sectional view of a portion of said machine, the section being taken on the axis of the cross-feed screw.

Fig. 4 is a diagrammatic view, showing the grinding wheel in the workpiece.

Fig. 12 is a front elevation of the machine.

Fig. 13 is an enlarged sectional view on the axis of the cross-feed screw.

Fig. 14 is a wiring diagram.

Like reference characters refer to like parts throughout the drawings.

Figure 6:
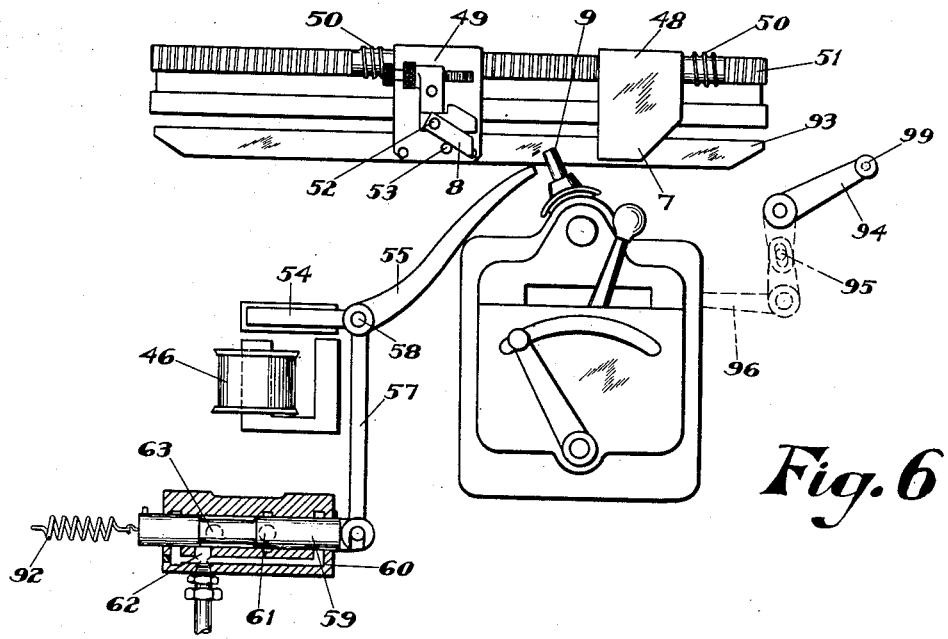
Fig. 6 is an enlarged fragmentary front elevation showing the table reversing devices.

Referring first to Fig. 1, the machine provides the usual reciprocatory table or carriage 1, which is ordinarily provided in any internal grinding machine. In such a machine, either the grinding wheel or the work to be ground may be carried on the table 1, the reciprocations of the latter being utilized in either case to produce a relative traversing movement between the grinding wheel and the work. As here shown, the table 1 supports and carries a wheel head 2 of the usual construction,—while the work which is to be operated upon is held in a work head 3, the latter being carried by a bridge 4 which spans the slideways provided by the machine frame for the back and forth movement of the table 1.

Said back and forth movement to cause the rotating grinding wheel 5 to make the required interior traverse of the rotating workpiece 6, may be imparted in any well known manner, as for instance by the use of the fluid pressure controlling and reversing mechanism which forms the subject of the patent to Heald and Guild, No. 1,582,468, granted April 27, 1926. Such mechanism for driving the reciprocating table forms no part of the present invention and a detailed description thereof is therefore unnecessary; it is sufficient to note, for the purposes of the present application, that the driving means employed for the reciprocation of the table 1, be it hydraulic drive, or gear drive, or any other type, procures the reversal of said table at each end of the latter's normal working stroke by the use of spaced adjustable dogs 7 and 8, carried by the table and adapted to alternately engage and move an interposed member 9, whose position controls the direction of table travel.

Figure 9:
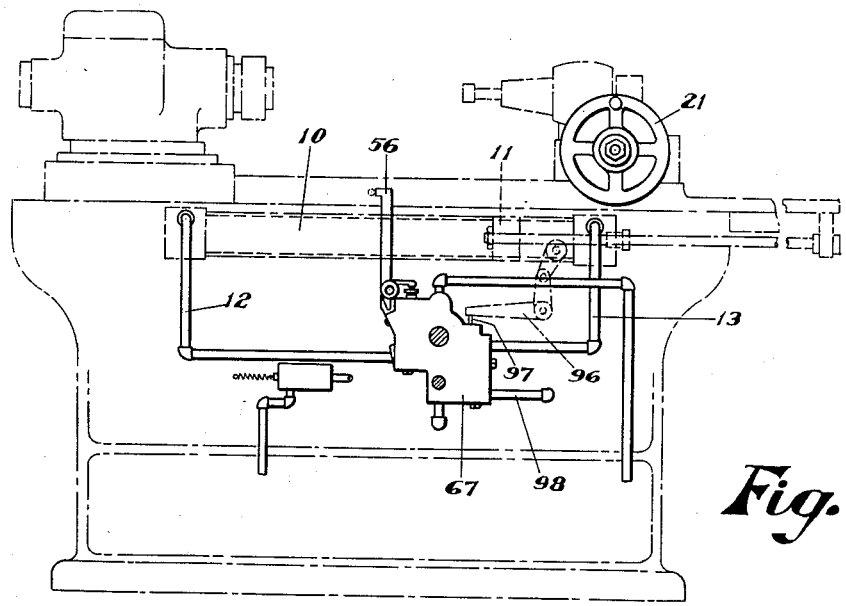
Fig. 9 is a sectional elevation of the grinding machine, showing the fluid pressure actuating devices for the table.

However, since the mechanism employed to procure lateral separation between the work and wheel, which is the subject of the present invention, is most conveniently actuated by fluid pressure, the table 1 is desirably operated in the same manner, and to this end a cylinder 10 (see Fig. 9), having a piston 11 therein, constitutes the table-actuating motor, and a reversing member 9, by means of valve mechanism not herein shown, (but fully described in said Heald and Guild Patent No. 1,582,468) alternately directs the pressure fluid to pipes 12 and 13 which lead to opposite ends of said cylinder 10.

Referring now to Fig. 2, the cross-feed mechanism, which is used to maintain the wheel in cutting relation to the work, is here shown as adapted to move the wheel head 2 transversely on the table 1. Said feeding mechanism may be actuated in any suitable manner, but as here shown, it is moved by engagement of a roller 14, carried by the table 1, with a cam member 15, mounted on a bar 16 that is attached in any suitable manner to the frame of the machine. The roller 14 is carried by a member 17 pivotally attached to the reciprocatory table 1. The member 17 carries a spring pressed pawl 18, adapted to engage a ratchet 19 that, in any suitable manner, is connected to the cross-feed screw 20, so that the latter, in response to reciprocations of the table 1, will turn step-by-step to progressively feed the wheel head 2 across said table.

Referring now to Fig. 3, from which the above described feed-screw actuating devices have been omitted for the sake of simplicity, the feed screw 20, at the front end of which is the usual hand wheel 21, is rotatably mounted in a journal or bearing 22 provided by an adjustable support 23 mounted on the table 1. Said adjustable support 23 is chiefly provided for ease in manufacturing the parts, and to all intents and purposes it is a part of the table 1. It provides cross ways 24, best shown in Fig. 5, for lateral travel of a cross slide or carriage 25 on which the wheel head 2 is mounted.

Reverting to Fig. 3, the cross slide 25 has attached to the under side thereof an internally threaded member 26, through which the screw 20 extends. By rotation of the latter, assuming for the moment that it is held against axial movement, the slide 25 will be moved on its ways 24. Normally, during the grinding operation on a workpiece, the shaft 20 is held from axial movement, and this is effected in the following manner:—

At the rear of the machine, or the right hand portion of Fig. 3, the shaft 20 is provided with a shoulder 27. Spaced from this shoulder 27 is the threaded end 28 of the shaft, adapted to receive a nut 29. Between the shoulder 27 and the threaded end 28, the shaft 20 is a plain cylinder, and on this cylindrical portion are the inner races of a pair of ball bearings 30 and 31. The inner race of bearing 30 is against the shoulder 27 and the inner race of bearing 31 is engaged by the nut 29. The outer race of bearing 30 engages a shoulder 32, while the outer race of bearing 31 engages a shoulder 32a, both of said shoulders being provided on the internal cylindrical surface of a member 33.

The member 33 is externally threaded and is received in a threaded portion 34 of the support 23 which, as already noted, is to all intents and purposes a part of the table 1. It will readily be seen that, so long as the member 33 remains unmoved, the shaft 20 will be held from axial movement. All chances for end play is eliminated first, by the fact that the nut 29 can be tightened against the inner race of ball bearing 31, thus forcing the outer race of said bearing against the shoulder 32a, which forces shoulder 32 against the outer race of bearing 30, thus tightening the inner race of said bearing against the shoulder 27. Secondly, because the external threads of member 33 and the internal threads of member 34 are carefully made and of the square type.

Desirably, any possibility of end play is also eliminated between the screw 20 and the member 26 by providing a nut 35 (which is prevented from turning by a key 36) and a spring 37 extending between the member 26 and said nut, this being an expedient well known in the art for this purpose.

Figure 7:
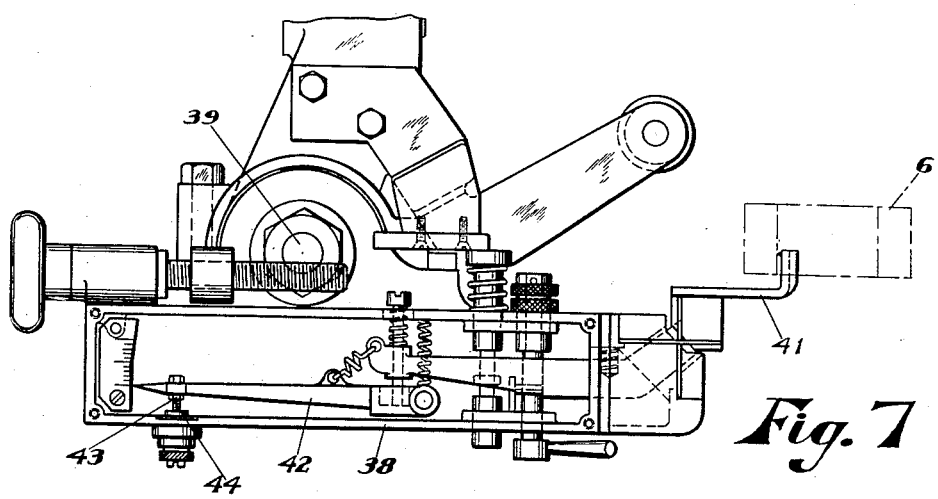
Fig. 7 is a plan view of the work-calipering mechanism.
Figure 8:
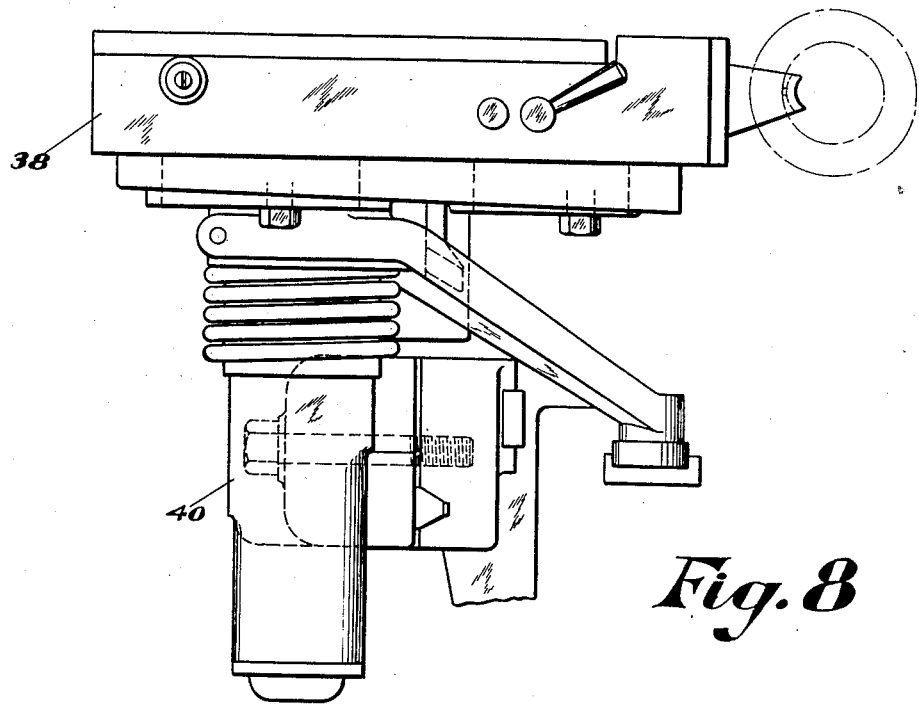
Fig. 8 is a side elevation of said work-calipering mechanism.

Referring now to Figs. 1 and 2, and to Figs. 7 and 8 for the details, a work-calipering mechanism is contained in a box-like structure 38 that is pivotally attached at 39 to a bracket 40 fastened to the bridge 4. During the grinding operation, the box 38 is in the position shown in Figs. 7 and 8, thus maintaining a work-calipering lever 41 in contact with the gradually enlarged internal periphery of the workpiece 6. Movement of lever 41 is transmitted to a contact-making lever 42. The actual details of construction of these levers and associated mechanism are not germane to the present invention, it being sufficient to note that the motion of lever 41 is transmitted, greatly magnified, to lever 42. The latter carries a grounded contact terminal 43, in the path of which is a stationary terminal 44.

Figure 11:
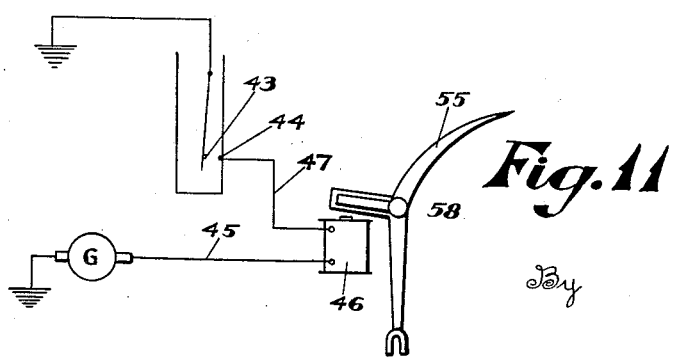
Fig. 11 is a wiring diagram.

Referring now to the wiring diagram of Fig. 11, any source of electricity, such as a generator G, has one terminal grounded as shown. The other terminal thereof leads, by a conductor 45, to an electromagnet 46. The other terminal of magnet 46 is connected by a conductor 47 to the terminal 44. It is obvious that when the contacts 43 and 44 are brought together, the electromagnet 46 will be energized.

In Fig. 1 the electromagnet 46 is shown on the front of the machine. Fig. 6 is an enlarged view of the magnet and the table operating mechanism, and as there shown, the reversing member is located during the grinding operation between the dogs 7 and 8. The right hand dog 7 is either integral with or attached to a block which, the same as block 49 of dog 8, is an adjustable block, adapted to maintain its predetermined setting longitudinally of the table 1 by means of any suitable adjusting device, such as the screw nuts 50—50 provided by both of said blocks and engaging with a screw rack 51 carried by the table 1. However, the dog 8 is a pivotal dog, being mounted on a pin 52 and normally held by gravity against a pin 53. When, however, the electromagnet 46 is energized, thus attracting an armature member 54, a lever arm 55, integrally connected to said armature, is raised into the path of dog 8, and the latter is rendered ineffective to shift the reversing member 9, but rides on the inclined surface of said arm 55 until it has passed over the reversing member 9. The table 1, therefore, continues uninterrupted on its stroke to the right, finally being brought to a stop in the position of Figs. 1, 2 and 9, by any suitable means, such as the bypassing valve device shown and described in the aforesaid Patent No. 1,582,468 to Heald and Guild, the actuating lever therefor being herein shown at 56, Fig. 9.

Figure 10:
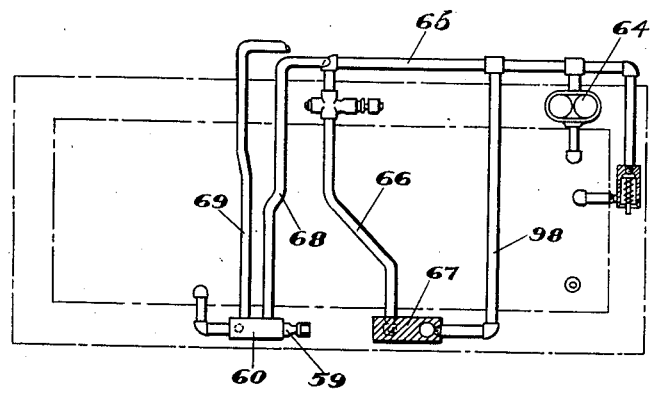
Fig. 10 is a plan view of the same.

The present invention, as previously set forth, contemplates means for laterally separating the work and wheel before the above described extended right hand movement of table 1 takes place. As shown in Fig 6, the armature 54 and lever arm 55 have a downward extension 57, said three integrally united parts being pivoted on a stud 58. The extension is connected to a slidable valve 59 located in a valve casing 60. Said casing provides a fluid entrance port 61, an exhaust port 62 connected to an oil reservoir in the base of the machine, and a port 63 to lead fluid to the mechanism that laterally separates the work and the wheel. As shown in Fig. 10, a pump 64 may be provided on the machine to supply fluid under pressure, and the supply pipe 65 from this pump has a branch 66 which leads to the table-reversing valve 67, see Figs. 9 and 10. Another branch 68 from the line 65 leads to the valve casing 60 connecting with the port 61.

Figure 5:
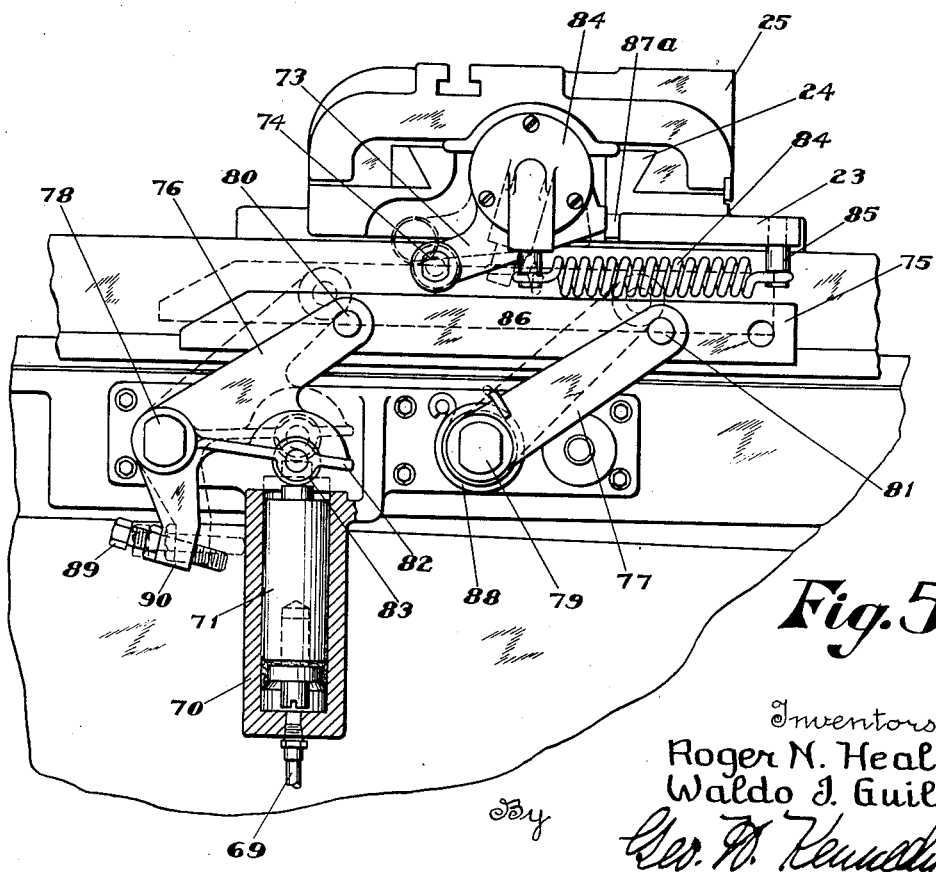
Fig. 5 is an enlarged fragmentary rear elevation, partly in section, showing the mechanism which actuates the separation between the work and the wheel.

When the slidable valve member 59 is moved to the right, Figs. 6 and 10, the port 61 is connected with the port 63, and under these conditions, the fluid flows into pipe 69 and thus to the bottom of a cylinder 70, which is shown in section Fig. 5. In said cylinder 70 is a piston 71. The fluid pressure raises said piston 71 and this action serves to angularly move the member 33 in the following manner:—

Referring to Figs. 3 and 5, the member 33 has attached to it a substantially annular member 72 provided with an arm 73. The latter carries a roller 74 which, when the table 1 is in the grinding position or range, moves back and forth in a horizontal path, just clearing a horizontal bar 75. The object of having the roller 74 clear the bar 75 is to insure the grinding wheel remaining steady during the grinding operation in order to grind accurately, as dirt getting on the bar 75 would cause the wheel to jump and cut unevenly.

Said bar 75 is pivotally connected to a pair of links 76 and 77, which latter are also pivotally mounted on the machine frame at 78 and 79, the distance between 78 and 79 being the same as the distance between the points 80 and 81 where the links connect to the bar. Since the lengths of links 76 and 77, as measured between pivotal points 78 and 80 on the one hand, and 79 and 81 on the other, are also equal, this forms a parallel motion mechanism, and the bar 75 will be always horizontal, since the points 78 and 79 are in the same horizontal plane.

The link 76 has an arm 82 with a roller 83 which is located above the piston 71. Movement of the piston is transmitted to the link 76, thus raising the bar 75 to the dotted line position shown in Fig. 5. This rocks the arm 73 and therefore turns the member 33, irrespective of the exact position of the table 1 in its grinding traverse. To return the parts to original position after the above described actuation, a spring 84 is provided extending from a pin 85 on the support 23 to a pin 86 on a cap or dirt guard 87, fastened to the annular member 72,—said spring bringing the parts against a stop 87a on support 23 and thereby returning the wheel to correct grinding position. Also, desirably, a torsion spring 88 is employed, being for example, coiled around the stationary pivot stud 79 of the link 77 and hooked over said link. The movement of the linkage mechanism is preferably made adjustable in amount, as by means of an adjusting screw 89 in a downward extension 90 of the link 76, which adjusting screw strikes any fixed object, such as the side of the cylinder 70.

The operation of the machine has been indicated in the foregoing description of the parts and motions, but briefly it takes place as follows:—

The machine having been properly adjusted and the caliper mechanism in the box 38 having been set to secure contact of terminals 43 and 44 when the workpiece reaches the exact desired size, the operator, having chucked an unground workpiece in the workhead 3, moves the starting lever 91, which is connected to the reversing member 9, and starts the table 1 to carry the grinding wheel 5 into the workpiece 6. Thereupon, by mechanism which it is not necessary to describe herein, the box 38 swings inwardly and carries the caliper lever 41 into contact with the workpiece 6. Also the pivotal dog 8 lifts over the reversing member 9, placing the latter between the dogs 7 and 8, and then the grinding proceeds automatically, the wheel 5 traversing back and forth and being fed transversely to cut progressively deeper into the material of the workpiece at each alternate stroke of the table 1. When the workpiece reaches finished size, the caliper lever will have moved the contact lever 42 to bring together the contact terminals 43 and 44, and when this happens, the electromagnet 46 is energized, as aforesaid. Thereupon the valve member 59 is moved, and the fluid under pressure enters the cylinder 70, thus raising the bar 75 to the dotted line position of Fig. 5. This action turns the member 33 and consequently moves it slightly to the left, Fig. 3, on an axial line, the threads on said member and on the portion 34 being cut so as to give this result when the member 33 is turned as indicated. This, in turn, moves the feed screw 20 a slight distance to the left, Fig. 3, and therefore also the cross slide 25 and wheel head 2.

Referring now to Fig. 4, this sudden movement of the cross slide and wheel head "backs off" the grinding wheel 5 from the workpiece as indicated in dotted lines in this figure, the movement being purposely somewhat exaggerated. The table 1 now runs outwardly to the position of Fig. 1 and as it begins this extended movement to the right, the caliper box 38 automatically swings outwardly to withdraw the lever 41 from the hole in the finished workpiece. This breaks the electrical circuit through the magnet 46, by separating the contacts 43, 44, and thereupon the valve member 59 returns to the position of Fig. 6, under the influence, for example, of a spring 92. The pressure fluid thereupon exhausts from the cylinder 70, by the action of the spring 88, the fluid finding its outlet into the machine base by way of the port 63 in the valve casing 60.

The outward travel of the table 1 is effected at high speed. The means for doing this is not per se the subject of the present invention, but such means may consist of a cam bar 93 fastened to the block 49 and adapted to engage and depress a lever 94 on the front of the machine. See Figs. 1 and 6. The lever 94 has a pin and slot connection 95 with a lever 96 which actuates a by-passing valve, not shown. The stem 97 of this valve appears in Fig. 9, and when the valve is opened, the pressure fluid from the supply line 65 goes directly to the reversing valve by way of a branch line 98, instead of passing through the usual throttle valve. If the cam bar 93 is set too close to the roller 99 of lever 94, the table 1 starts to accelerate before the wheel 5 completely leaves the workpiece, this being one cause of the lines and scratches made on the workpiece, but with the present invention, it does not matter when this acceleration occurs, since the work and wheel are separated laterally before it begins.

Figure 12:
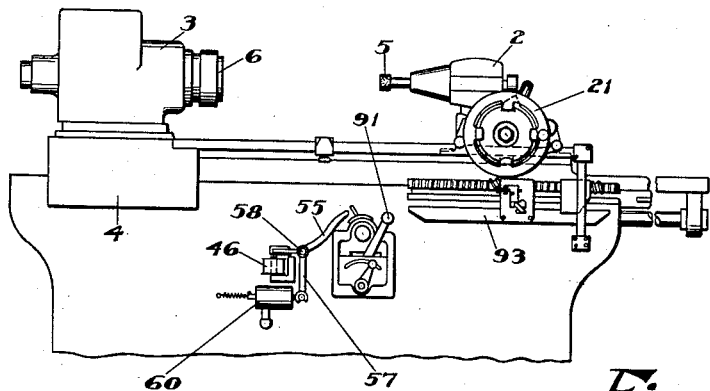
Figs. 12, 13 and 14 illustrate the invention applied to a grinding machine in which the size of the work is determined by the cross-feed mechanism, and in these figures.
Figure 13:
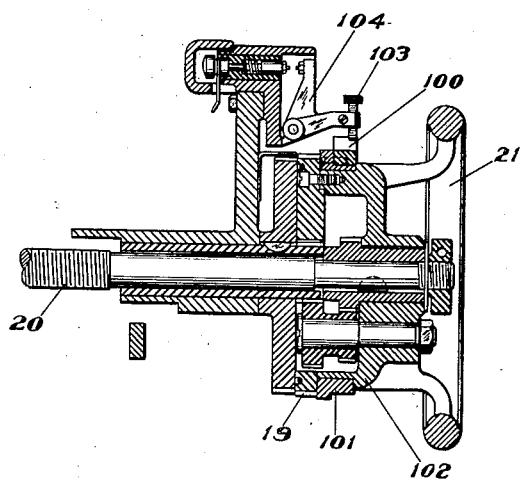
Figure 14:
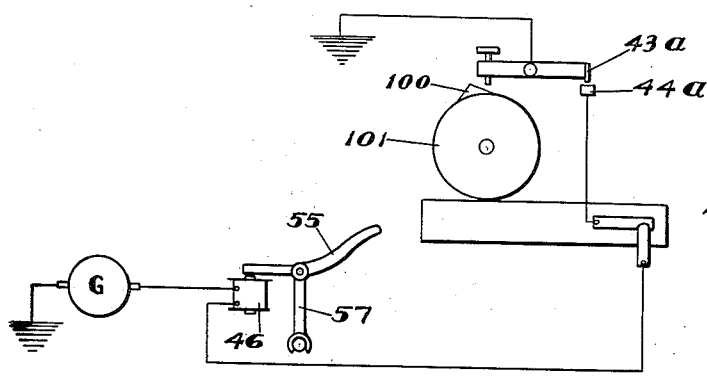

In Figs. 12, 13 and 14 is shown a grinding machine which automatically procures the cessation of grinding in response to movement of the cross-feed mechanism. In the application of the present invention thereto, the same numerals are used to indicate the identical parts. Referring to the wiring diagram of Fig. 14, the electromagnet 46 is energized when two contacts 43a and 44a are brought together. Said contacts are brought together when a cam 100 on a ring 101 carried by the hub 102 of hand wheel 21 engages a thumb screw 103 carried by a rock lever 104. See Fig. 13 for the mechanical construction. Since the hand wheel 21 is connected to the screw shaft 20 (preferably by reduction gearing not necessary to describe herein), and since the ratchet 19 is directly connected to the hub 102 of the hand wheel, it follows that the actuation of magnet 46 is controlled directly from the cross-feed mechanism.

The magnet 46 in this embodiment of the invention controls the same instrumentalities to cause the grinding wheel and workpiece to first separate laterally and then longitudinally, the last by the extended right hand movement of the table 1, but in this embodiment of the invention, it should be noticed that this occurs always at the same place in the short work-traversing stroke, viz., at the inward end of the instroke, for it is there that the cam 15 on bar 16 moves the pawl 18, and hence at that position only can the contact between 43a and 44a be made. So it will be seen that the last and final grinding stroke is the inward stroke preceding the runout, and as this is a stroke without feed, the workpiece is given a very fine finish.

We claim,

1. In a grinding machine, a cross feed screw, means to turn said screw to produce the normal cutting feed of the machine, screw threaded means surrounding said cross feed screw, and means to turn said last named means upon completion of a grinding operation, whereby to move said cross feed screw axially to cause the grinding operation to cease.

2. In a grinding machine, a table or carriage, means for giving said table or carriage a reciprocatory motion, a second carriage on said first carriage, a cross feed screw carried by said first carriage and adapted, when turned, to feed said second carriage on said first carriage transversely to the line of reciprocation, screw threaded means adapted, when turned, to move said cross feed screw axially, and hydraulic means to turn said screw threaded means.

3. In a grinding machine, a table or carriage, means for giving said table or carriage a reciprocatory motion, a second carriage or cross slide on said first carriage, a cross feed screw adapted, when turned, to effect a progressive cross feed movement of said second carriage on said first carriage, transversely to the line of reciprocation of said first carriage, automatic means for extending the reciprocatory motion of the first carriage, and means responsive thereto for effecting a retraction of the cross feed movement of the second carriage on said first carriage without turning said cross feed screw.

4. In a grinding machine, the combination with a grinding wheel, a workhead, a reciprocatory table for producing a relative traverse between said parts, a cross slide mounted on said reciprocatory table, and means for feeding said cross slide to effect a relative cross feed between said wheel and a workpiece in said workhead, of devices operated directly by said cross slide feeding means for causing said table to move beyond its normal traverse, to substantially separate said wheel and workhead along the line of said reciprocation, and for causing said cross slide to separate said wheel and workpiece along the line of said cross feed.

5. In a grinding machine, the combination with a grinding wheel, a workhead, a reciprocatory table for producing a relative axial traverse between said parts, a cross slide mounted on said reciprocatory table, and means for feeding said cross slide to effect a relative cross feed between said wheel and a workpiece in said workhead, of means actuated directly by said cross slide feeding means for causing said table to substantially separate said wheel and workhead along the line of said reciprocation, and hydraulic means responsive to said last-named means for causing said cross slide to separate said wheel and said workhead along the line of said cross feed.

6. In a grinding machine, the combination with a grinding wheel, a workhead, means for producing a relative reciprocatory traverse between said parts, and rotary means for effecting a cross feed of one of said parts relative to the other, of automatic means for causing said wheel and workhead to separate along the line of said relative reciprocatory traverse, and screw threaded means operative on said rotary means, without turning of the latter, to cause said workhead and wheel to separate along the line of said cross feed substantially coincident with the separation along the line of said reciprocatory traverse.

7. In a grinding machine, the combination with a grinding wheel, a workhead, means for producing a relative reciprocatory traverse between said parts, and rotary means for effecting the cross feed of one of said parts relative to the other, of automatic means for causing said wheel and workhead to separate along the line of said reciprocatory traverse screw threaded means operative on said rotary means, without turning of the latter, to cause said workhead and wheel to separate along the line of said cross feed, and hydraulic means brought into operation by said automatic means to actuate said screw threaded means.

Dated Mar. 25, 1927.

ROGER N. HEALD.
WALDO J. GUILD.